(12) United States Patent
Yoo

(10) Patent No.: US 11,870,108 B2
(45) Date of Patent: Jan. 9, 2024

(54) FUEL CELL

(71) Applicants: Hyundai Motor Company, Seoul (KR); Kia Motors Corporation, Seoul (KR)

(72) Inventor: Sung Hun Yoo, Yongin-si (KR)

(73) Assignees: Hyundai Motor Company, South (KR); Kia Motors Corporation, South (KR)

( * ) Notice: Subject to any disclaimer, the term of this patent is extended or adjusted under 35 U.S.C. 154(b) by 123 days.

(21) Appl. No.: 17/164,279

(22) Filed: Feb. 1, 2021

(65) Prior Publication Data

US 2022/0109164 A1 Apr. 7, 2022

(30) Foreign Application Priority Data

Oct. 7, 2020 (KR) .................. 10-2020-0129344

(51) Int. Cl.
*H01M 8/0258* (2016.01)
*H01M 4/88* (2006.01)
*H01M 8/1004* (2016.01)

(52) U.S. Cl.
CPC ....... *H01M 8/0258* (2013.01); *H01M 4/8807* (2013.01); *H01M 8/1004* (2013.01)

(58) Field of Classification Search
CPC .. H01M 4/8807; H01M 8/023; H01M 8/0258; H01M 8/04156; H01M 8/04291; H01M 8/1004; H01M 2008/1095; Y02E 60/50
See application file for complete search history.

(56) References Cited

U.S. PATENT DOCUMENTS

| 8,911,919 B2 | 12/2014 | Ko et al. |
| 2005/0244689 A1 | 11/2005 | Horiguchi et al. |
| 2009/0214929 A1* | 8/2009 | Gao .................... H01M 8/0267 429/457 |

(Continued)

FOREIGN PATENT DOCUMENTS

| CN | 109065907 A | * 12/2018 | ............ H01M 8/026 |
| JP | 2020047443 A | * 3/2020 | |

(Continued)

OTHER PUBLICATIONS

Bazylak, A., et al. "Numerical and microfluidic pore networks: Towards designs for directed water transport in GDLs." Electrochimica Acta 53.26 (2008): 7630-7637 (Year: 2008).*

(Continued)

*Primary Examiner* — Matthew T Martin
*Assistant Examiner* — Jared Hansen
(74) *Attorney, Agent, or Firm* — Slater Matsil, LLP

(57) ABSTRACT

A fuel cell includes a membrane electrode assembly, gas diffusion layers stacked on each side of the membrane electrode assembly, respectively, separators stacked on the gas diffusion layers, respectively, the separators including channels through which reactant gases move and lands in contact with a respective one of the gas diffusion layers, and a flow path forming part provided on a land surface of one of the lands in contact with the respective one of the gas diffusion layers, the flow path forming part providing a condensate flow path for moving condensate between the land surface and the one of the gas diffusion layers.

13 Claims, 12 Drawing Sheets

(56) References Cited

U.S. PATENT DOCUMENTS

| | | | |
|---|---|---|---|
| 2012/0028139 A1 | 2/2012 | Kawajiri et al. | |
| 2012/0070760 A1 | 3/2012 | Ko et al. | |
| 2013/0302723 A1 | 11/2013 | Ko et al. | |
| 2017/0170491 A1* | 6/2017 | Kim | H01M 8/04291 |
| 2018/0175405 A1* | 6/2018 | Jo | H01M 8/0258 |
| 2021/0202961 A1* | 7/2021 | Kobayashi | H01M 8/242 |

FOREIGN PATENT DOCUMENTS

| | | |
|---|---|---|
| KR | 100843873 B1 | 7/2008 |
| KR | 101240973 B1 | 3/2013 |
| KR | 101410479 B1 | 6/2014 |
| KR | 101730105 B1 | 4/2017 |

OTHER PUBLICATIONS

CN109065907A machine English translation, Sun Yi, et al., "A flow field structure of a fuel cell electrode plate and a fuel cell electrode plate", retrieved from https://worldwide.espacenet.com/ Date: Oct. 28, 2022 (Year: 2018).*

Jp2020047443a, Kato et al., "Fuel Battery", machine English translation retrieved from https://worldwide.espacenet.com/ date: Feb. 6, 2023 (Year: 2020).*

Fan, Linhao, et al. "Optimization design of the cathode flow channel for proton exchange membrane fuel cells." Energy conversion and management 171 (2018): 1813-1821 (Year: 2018).*

Baik, Kyung Don, and II Sung Seo. "Metallic bipolar plate with a multi-hole structure in the rib regions for polymer electrolyte membrane fuel cells." Applied energy 212 (2018): 333-339 (Year: 2018).*

Baik, Kyung Don, et al. "Effect of multi-hole flow field structure on the performance of H2/O2 polymer electrolyte membrane fuel cells." International Journal of Hydrogen Energy 44.47 (2019): 25894-25904 (Year: 2019).*

* cited by examiner

FUEL CELL

CROSS-REFERENCE TO RELATED APPLICATIONS

This application claims the benefit of Korean Patent Application No. 10-2020-0129344, filed in the Korean Intellectual Property Office on Oct. 7, 2020, which application is hereby incorporated herein by reference.

TECHNICAL FIELD

The present disclosure relates to a fuel cell.

BACKGROUND

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane that may allow hydrogen positive ions to move therethrough, and electrodes (catalyst electrode layers) provided on both surfaces of the electrolyte membrane to enable a reaction between hydrogen and oxygen. The fuel cell may also include gas diffusion layers (GDLs) disposed to be in close contact with both surfaces of the membrane electrode assembly and configured to distribute reactant gases and transfer the generated electrical energy, and separators (bipolar plates) disposed to be in close contact with the gas diffusion layers and configured to define flow paths.

The separators may include an anode separator for supplying hydrogen which is fuel, and a cathode separator for supplying air which is an oxidant. The separator includes channels through which the fuel or the oxidant flows, and lands which are in contact with the channels and the gas diffusion layers and serve as electrical passageways.

Meanwhile, because water is produced at a cathode side of the fuel cell stack by an electrochemical reaction, water droplets are produced in the channel, the gas diffusion layer, or the electrode due to condensation of moisture vapor when a dew point temperature of the reactant gas is higher than an operating temperature of the fuel cell stack.

This is called a flooding phenomenon. The flooding phenomenon causes uneven flow of the reactant gas and deficiency of the reactant gas on the electrode, which causes deterioration in performance of the fuel cell stack.

Therefore, in order to prevent the flooding phenomenon and stabilize the performance of the fuel cell stack, it is necessary to effectively discharge condensate (water) produced between the gas diffusion layer and the separator.

However, in the related art, only the condensate produced between the channel (the channel of the separator) and the gas diffusion layer may be discharged to the outside by the gas flowing along the channel, but it is difficult to discharge the condensate produced between the land (the land of the separator) and the gas diffusion layer to the outside of the land (to the channel). As a result, the condensate remains between the land and the gas diffusion layer, which causes a problem of deterioration in performance and operational efficiency of the fuel cell stack.

Moreover, in the related art, there is a problem in that when the fuel cell stack is repeatedly frozen or defrosted, the structure of the gas diffusion layer is deformed and damaged as the condensate remaining between the land and the gas diffusion layer is frozen or defrosted.

Therefore, recently, various types of research have been conducted to effectively discharge the condensate produced between the gas diffusion layer and the land of the separator, but the research result is still insufficient. Accordingly, there is a need for development of a technology for effectively discharging the condensate produced between the gas diffusion layer and the land of the separator.

SUMMARY

The present disclosure relates to a fuel cell. Particular embodiments relate to a fuel cell with improved performance and operational efficiency.

Embodiments of the present disclosure may effectively discharge condensate produced between a gas diffusion layer and a land of a separator.

Embodiments of the present disclosure may minimize deformation of and damage to a gas diffusion layer and improve durability.

Embodiments of the present disclosure may minimize residual condensate produced between a gas diffusion layer and a land of a separator and reduce contact resistance between a gas diffusion layer and a separator.

Embodiments of the present disclosure may improve stability and reliability.

The object to be achieved by the exemplary embodiments is not limited to the above-mentioned objects, but also includes objects or effects that may be recognized from the solutions or the exemplary embodiments described below.

An exemplary embodiment of the present disclosure provides a fuel cell including a membrane electrode assembly (MEA), gas diffusion layers stacked on the membrane electrode assembly, separators stacked on the gas diffusion layers and having channels through which reactant gases move and lands which are in contact with the gas diffusion layers, and a flow path forming part protruding from a land surface of the land which is in contact with the gas diffusion layer, the flow path forming part being configured to provide a condensate flow path for moving condensate between the land surface and the gas diffusion layer.

This is to improve performance and operational efficiency of the fuel cell.

That is, in the related art, only the condensate produced between the channel of the separator and the gas diffusion layer may be discharged to the outside by the gas flowing along the channel, but it is difficult to discharge the condensate produced between the land of the separator and the gas diffusion layer to the outside of the land (to the channel). As a result, the condensate remains between the land and the gas diffusion layer, which causes a problem of deterioration in performance and operational efficiency of the fuel cell. Moreover, in the related art, there is a problem in that when the fuel cell is repeatedly frozen or defrosted, the structure of the gas diffusion layer is deformed and damaged as the condensate remaining between the land and the gas diffusion layer is frozen or defrosted.

In contrast, according to an exemplary embodiment of the present disclosure, the flow path forming part for forming the condensate flow path for moving the condensate is provided on the land surface of the land which is in contact with the gas diffusion layer, and as a result, it is possible to obtain an advantageous effect of minimizing the condensate remaining on the land surface, and thus improving performance and operational efficiency of the fuel cell.

The flow path forming part may have various structures capable of providing the condensate flow path.

According to an exemplary embodiment of the present disclosure, the condensate flow path may be defined as a space having a larger size than a pore of the gas diffusion layer. As described above, since the condensate flow path formed by the flow path forming part is formed to have the space (e.g., the pore) having a larger size than the pore of the gas diffusion layer, it is possible to obtain an advantageous effect of more effectively moving (capturing) the condensate, which exists in the gas diffusion layer, to the condensate flow path.

According to an exemplary embodiment of the present disclosure, at least a part of the condensate flow path communicates with the channel.

Since a part of the condensate flow path communicates with the channel as described above, the condensate moving along the condensate flow path may be discharged to the outside together with the reactant gas passing through the channel.

According to an exemplary embodiment of the present disclosure, the flow path forming part may include a plurality of protrusion patterns protruding from the land surface and spaced apart from one another, and the plurality of protrusion patterns may cooperatively form the condensate flow path.

In particular, the protrusion pattern may be provided to form an open loop.

According to an exemplary embodiment of the present disclosure, the protrusion pattern may include a first protrusion formed in a first direction, a second protrusion formed in the first direction and spaced apart from the first protrusion in the first direction, a third protrusion spaced apart from the first protrusion and formed in a second direction that intersects the first direction, and a fourth protrusion formed in the second direction and spaced apart from the third protrusion in the second direction.

In particular, the first protrusion, the second protrusion, the third protrusion, and the fourth protrusion may cooperatively form an X shape.

The number and the arrangement shape of the protrusion patterns, which constitute the flow path forming part, may be variously changed in accordance with required conditions and design specifications.

For example, the flow path forming part may include a first protrusion pattern, a second protrusion pattern spaced apart from the first protrusion pattern in a width direction of the land, a third protrusion pattern spaced apart from the first protrusion pattern in a longitudinal direction of the land, and a fourth protrusion pattern spaced apart from the second protrusion pattern in the longitudinal direction of the land.

Since the plurality of protrusion patterns (e.g., the first to fourth protrusion patterns), which form the X shape, are arranged in a n×n matrix (e.g., a 2×2 matrix) as described above, it is possible to obtain an advantageous effect of ensuring the discharge of the condensate and increasing the time for which the condensate stays (in the condensate flow path).

According to an exemplary embodiment of the present disclosure, at least one of the first protrusion, the second protrusion, the third protrusion, and the fourth protrusion may be provided to have a straight shape or a curved shape.

The flow path forming part may be formed in various ways in accordance with required conditions and design specifications.

According to an exemplary embodiment of the present disclosure, the flow path forming part may be formed by partially forming a part of the separator.

Since the flow path forming part is formed by partially forming a part of the separator as described above, it is possible to obtain an advantageous effect of reducing costs and simplifying a structure and a manufacturing process for forming the flow path forming part.

According to an exemplary embodiment of the present disclosure, the fuel cell may include connecting protrusion patterns protruding from the land surface, and the connecting protrusion patterns may connect the adjacent protrusion patterns.

Since the adjacent protrusion patterns are connected by the connecting protrusion pattern as described above, it is possible to prevent the condensate from being immediately discharged to the side (channel side) of the land through the gap between the adjacent protrusion patterns, and as a result, it is possible to obtain an advantageous effect of increasing the time for which the condensate stays in the condensate flow path.

In particular, the connecting protrusion pattern may be connected to outermost peripheral portions of the protrusion patterns in the width direction of the land.

According to an exemplary embodiment of the present disclosure, the flow path forming part may include a first flow path forming part provided on the land surface, and a second flow path forming part provided on the land surface and spaced apart from the first flow path forming part in a longitudinal direction of the land, a discharge path, through which the reactant gas passes, may be provided between the first flow path forming part and the second flow path forming part and may communicate with the condensate flow path, and the condensate may be discharged to the channel together with the reactant gas passing through the discharge path.

Since the discharge path is defined between the first and second flow path forming parts protruding from the land surface as described above, it is possible to obtain an advantageous effect of more effectively discharging (to the channel) the condensate moved to the edge portion (side portion) of the condensate flow path as well as the condensate produced on the land surface corresponding to the discharge path or an advantageous effect of more effectively drying the region in which the condensate exists.

According to an exemplary embodiment of the present disclosure, the discharge path may be formed to be inclined, with respect to the width direction of the land, in a movement direction in which the reactant gas moves along the land.

Since the discharge path, through which the reactant gas passes, is formed to be inclined with respect to the width direction of the land as described above, it is possible to obtain an advantageous effect of minimizing a decrease in flow pressure of the reactant gas and improving efficiency in discharging the condensate being discharged together with the reactant gas.

According to an exemplary embodiment of the present disclosure, the flow path forming part may be provided on the land surface and may include a porous structural member, and the condensate flow path may be defined by pores of the porous structural member.

DETAILED DESCRIPTION OF ILLUSTRATIVE EMBODIMENTS

Figure 1:
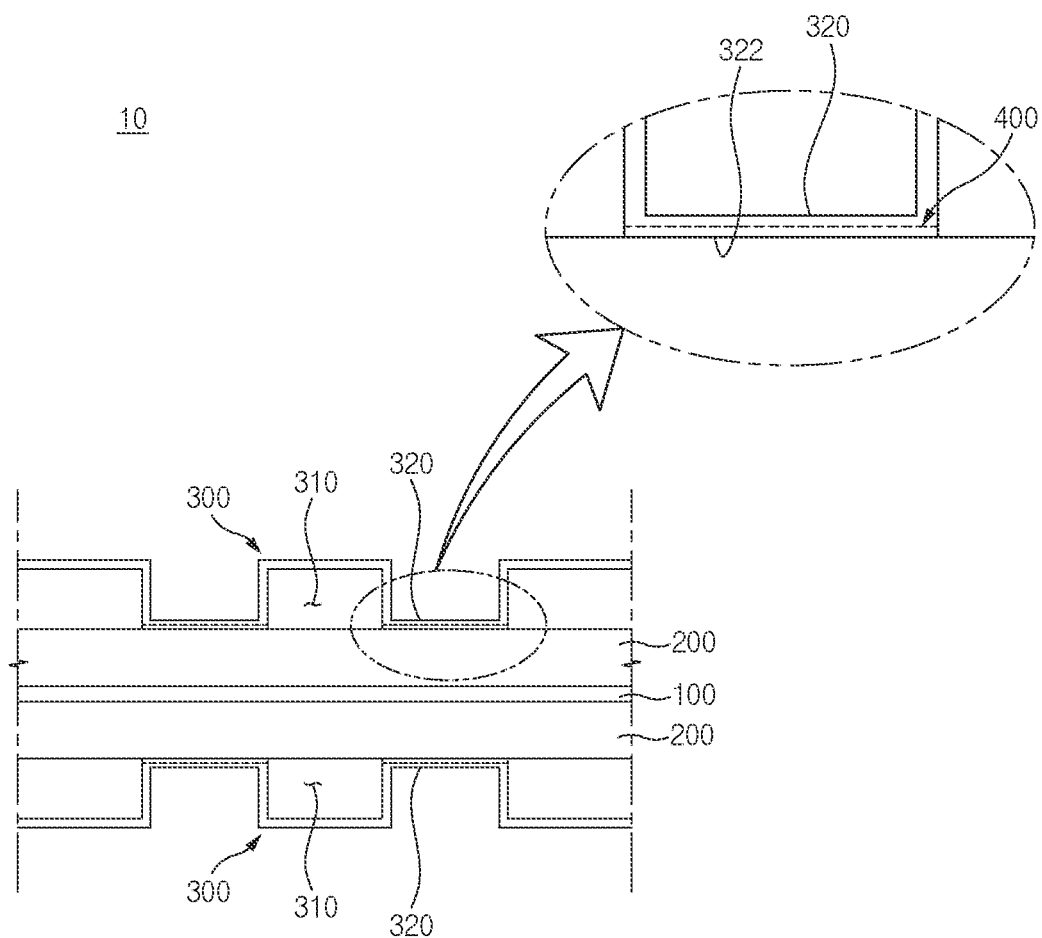
FIG. 1 is a view for explaining a fuel cell according to an exemplary embodiment of the present disclosure.
Figure 2:
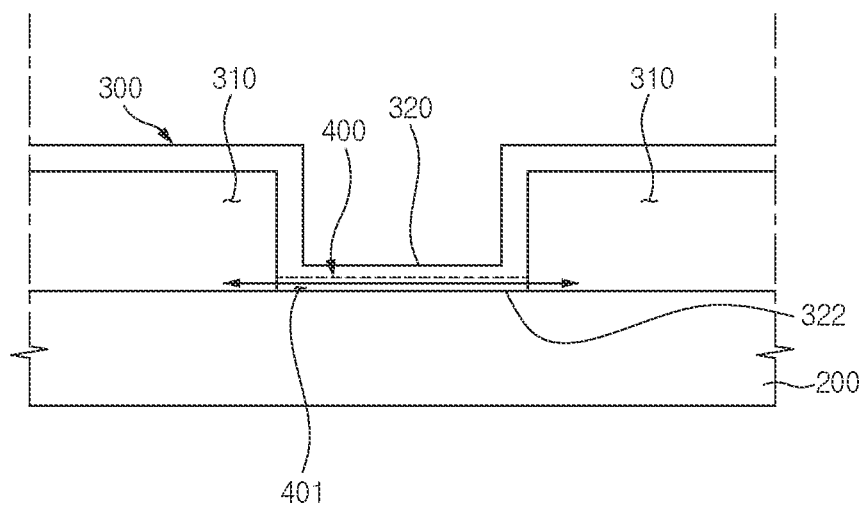
FIG. 2 is a view for explaining a separator in the fuel cell according to an exemplary embodiment of the present disclosure.
Figure 3:
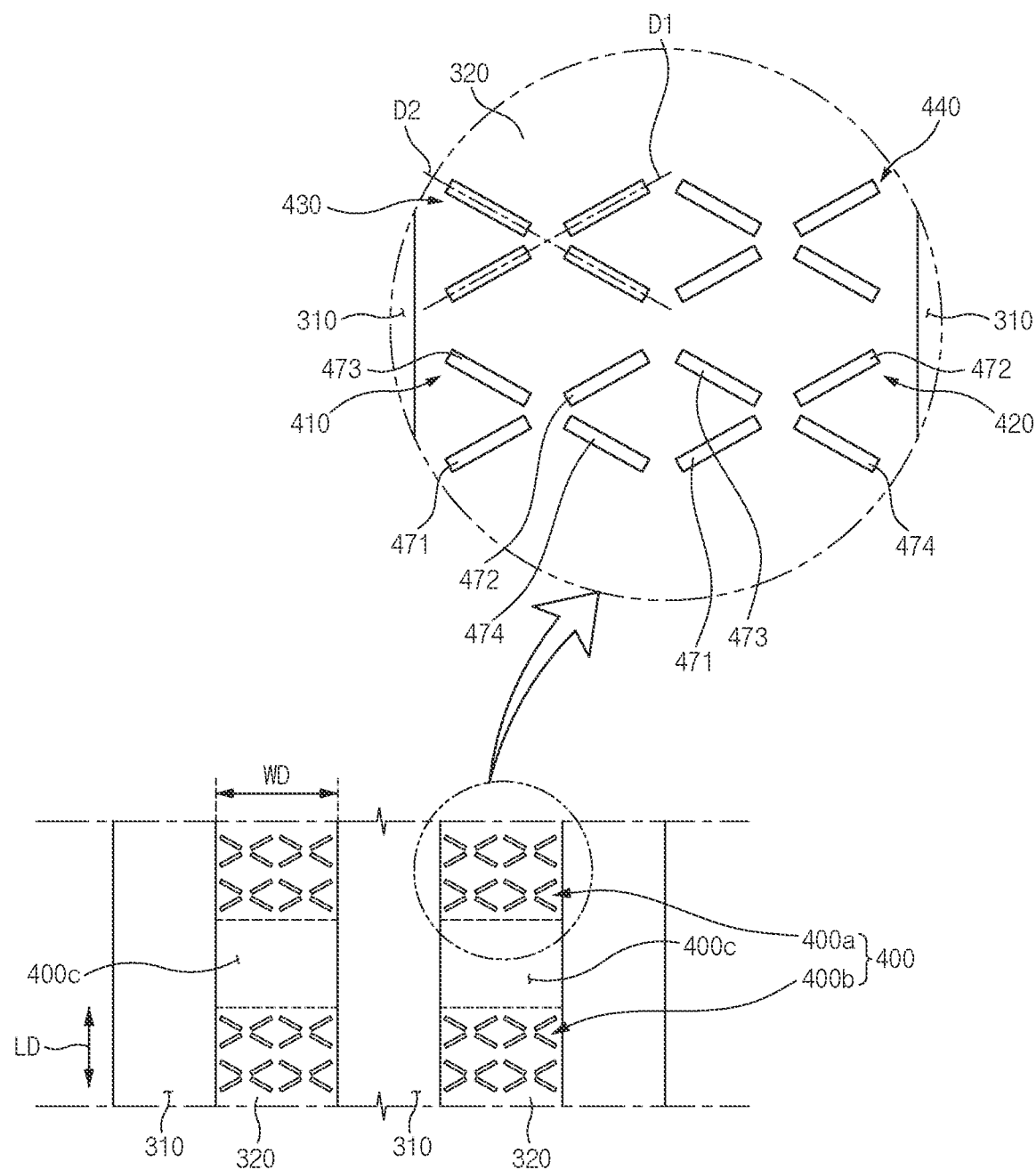
FIG. 3 is a view for explaining a flow path forming part in the fuel cell according to an exemplary embodiment of the present disclosure.
Figure 4:
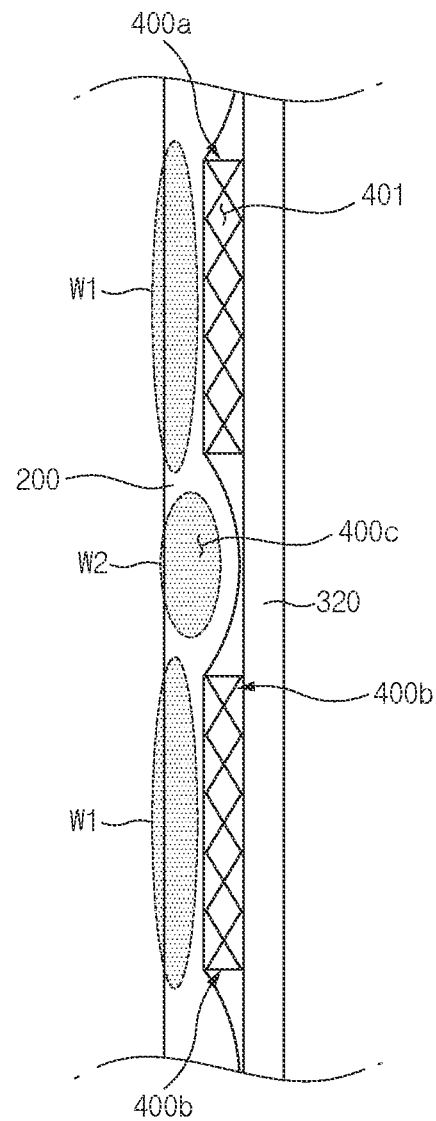
FIGS. 4 to 6 are views for explaining movement routes of condensate in the fuel cell according to an exemplary embodiment of the present disclosure.
Figure 5:
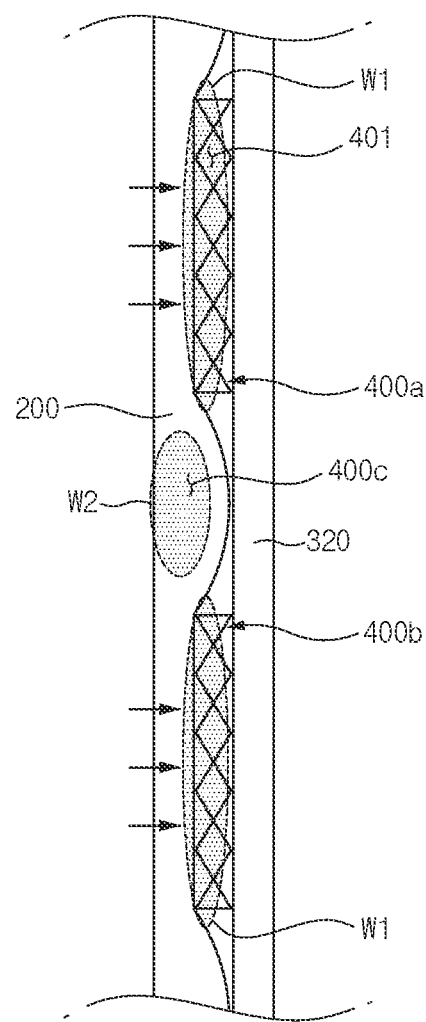

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 12, a fuel cell 10 according to an exemplary embodiment of the present disclosure includes a membrane electrode assembly (MEA) 100, gas diffusion layers 200 stacked on the membrane electrode assembly 100, and separators 300 stacked on the gas diffusion layers 200 and each having channels 310 through which reactant gases RG flow and lands 320 being in contact with the gas diffusion layer 200. The fuel cell 10 also includes flow path forming parts 400 each protruding from a land surface 322 of the land 320 being in contact with the gas diffusion layer 200, and the flow path forming part 400 provides a condensate flow path 401 between the land surface 322 and the gas diffusion layer 200 to move condensate.

The membrane electrode assembly (MEA) 100 is configured to generate electricity through an oxidation-reduction reaction between fuel (e.g., hydrogen), which is a first reactant gas, and an oxidant (e.g., air) which is a second reactant gas.

A structure and a material of the membrane electrode assembly 100 may be variously changed in accordance with required conditions and design specifications, and the present disclosure is not limited or restricted by the structure and the material of the membrane electrode assembly 100.

For example, the membrane electrode assembly 100 includes an electrolyte membrane through which hydrogen ions move, and catalyst electrode layers attached to both surfaces of the electrolyte membrane, and an electrochemical reaction occurs in the catalyst electrode layer.

The gas diffusion layers (GDLs) 200 are stacked on both sides of the membrane electrode assembly 100 and serve to uniformly distribute the reactant gases RG and transfer the generated electrical energy.

The gas diffusion layer 200 has a porous structure having pores having predetermined sizes.

The sizes of the pores and the material of the gas diffusion layer 200 may be variously changed in accordance with required conditions and design specifications, and the present disclosure is not limited or restricted by the sizes of the pores and the material of the gas diffusion layer 200.

The separator 300 serves not only to block air and hydrogen, which is the reactant gas RG, but to define flow paths for the air and the reactant gas RG and transmit electric current to an external circuit.

In addition, the separator 300 also serves to distribute heat, which is generated in the fuel cell 10, to the entire fuel cell 10, and the excessively generated heat may be discharged to the outside by a coolant flowing along cooling flow paths (not illustrated) in the separator 300.

In an exemplary embodiment of the present disclosure, the separators 300 may be defined as including an anode separator having flow paths for hydrogen which is fuel, and a cathode separator having flow paths for air which is an oxidant.

For example, the separator 300 may be formed as a thin metal film. The separators 300 (the anode separator and the cathode separator), together with the membrane electrode assembly 100, may constitute one fuel cell (unit cell) 10 and independently define the flow paths for the hydrogen, the air, and the coolant. According to another exemplary embodiment of the present disclosure, the separator may be made of other materials such as graphite or a carbon composite.

That is, the fuel cell (unit cell) 10 may include the membrane electrode assembly 100 and the separators 300 stacked on both surfaces of the membrane electrode assembly 100, respectively. A fuel cell stack (not illustrated) may be configured by stacking a plurality of fuel cells 10 in a reference direction (e.g., an up-down direction), and then assembling end plates (not illustrated) to both ends of the plurality of fuel cells 10.

For reference, hydrogen, which is the fuel, and air, which is the oxidant, are supplied to an anode (not illustrated) and a cathode (not illustrated) of the membrane electrode assembly 100, respectively, through the channels 310 in the separators 300 (the cathode separator and the anode separator). The hydrogen may be supplied to the anode, and the air may be supplied to the cathode.

The hydrogen supplied to the anode is separated into hydrogen ions (protons) and electrons by catalysts in the electrode layers provided on both sides of the electrolyte membrane. Only the hydrogen ions are selectively transmitted to the cathode through the electrolyte membrane, which is a cation exchange membrane, and at the same time, the electrons are transmitted to the cathode through the gas diffusion layer 200 and the separator 300 which are conductors.

At the cathode, the hydrogen ions supplied through the electrolyte membrane and the electrons transmitted through the separator 300 meet oxygen in the air supplied to the cathode by an air supply device, thereby creating a reaction of producing water. As a result of the movement of the hydrogen ions, the electrons flow through external conductive wires, and an electric current is produced as a result of the flow of the electrons.

For example, based on FIG. 1, the separator 300 (anode separator) for supplying hydrogen may be disposed on an upper surface of the membrane electrode assembly 100, and the separator 300 (cathode separator) for supplying air may be disposed on a bottom surface of the membrane electrode assembly 100.

More specifically, the surfaces of the separators 300, which face the gas diffusion layers 200 and are in close contact with outer surfaces of the gas diffusion layers 200 stacked on the membrane electrode assembly 100, are provided with the channels 310 through which the reactant gases RG (hydrogen and air) flow, and the lands 320 which are in contact with the gas diffusion layers 200.

The channels 310 and the lands 320 are alternately disposed in one direction (e.g., a horizontal direction based on FIG. 1), and the present disclosure is not limited or restricted by the sizes and the number of the channels 310 and the lands 320.

Referring to FIGS. 1 to 6, the flow path forming part 400 is provided on the land surface 322 of the land 320 which is in contact with the gas diffusion layer 200 and provides the condensate flow path 401 for moving condensate (water) produced by the reaction between the land surface 322 and the gas diffusion layer 200.

For reference, in an exemplary embodiment of the present disclosure, the condensate flow path 401 may be defined as a passageway or a space in which the condensate may move between the land surface 322 and the gas diffusion layer 200 without stagnating (i.e., the condensate may move to the outside of the land surface 322) (e.g., a space ensured between the gas diffusion layer 200 and the land 320 in a thickness direction of the gas diffusion layer 200).

The flow path forming part 400 may have various structures capable of providing the condensate flow path 401, and the present disclosure is not limited or restricted by the structure and the material of the flow path forming part 400.

In particular, the condensate flow path 401 may be defined as a space having a larger size than the pore of the gas diffusion layer 200 (e.g., as a space connected with the pores).

For example, the condensate flow path 401 may be defined as a space having a size larger than a size of the pore of the gas diffusion layer 200 (e.g., an average size of the pores of the gas diffusion layer 200).

This is because the condensate existing in the gas diffusion layer 200 is moved to the condensate flow path 401 by capillarity when the pore (space) of the condensate flow path 401 is larger than the pore of the gas diffusion layer 200.

As described above, since the condensate flow path 401 formed by the flow path forming part 400 is formed to have the space (e.g., the pore) having a larger size than the pore of the gas diffusion layer 200, it is possible to obtain an advantageous effect of more effectively moving (capturing) the condensate (W2 in FIGS. 4 and 5), which exists in the gas diffusion layer 200, to the condensate flow path 401.

In particular, at least a part of the condensate flow path 401 communicates with the channel 310.

In this case, the configuration in which at least a part of the condensate flow path 401 communicates with the channel 310 may include both a configuration in which the condensate flow path 401 communicates directly with the channel 310 and a configuration in which the condensate flow path 401 communicates indirectly with the channel 310 via another route (e.g., via a discharge path).

Since a part of the condensate flow path 401 communicates with the channel 310 as described above, the condensate moving along the condensate flow path 401 may be discharged to the outside together with the reactant gas RG passing through the channel 310.

According to an exemplary embodiment of the present disclosure, the flow path forming parts 400 may include a first flow path forming part 400a provided on the land surface 322, and a second flow path forming part 400b provided on the land surface 322 and spaced apart from the first flow path forming part 400a in a longitudinal direction of the land 320. According to another exemplary embodiment of the present disclosure, the fuel cell may include a single flow path forming part or three or more flow path forming parts.

According to an exemplary embodiment of the present disclosure, each of the first flow path forming part 400a and the second flow path forming part 400b may include a plurality of protrusion patterns 410, 420, 430, and 440 protruding from the land surface 322 and spaced apart from one another. The plurality of protrusion patterns 410, 420, 430, and 440 may cooperatively form the condensate flow path 401.

The protrusion patterns 410, 420, 430, and 440 may constitute various structures capable of forming the condensate flow path 401, and the present disclosure is not limited or restricted by the structure, the shape, the arrangement, and the number of the protrusion patterns 410, 420, 430, and 440.

In particular, the protrusion patterns 410, 420, 430, and 440 may be provided to form an open loop.

In this case, the configuration in which the protrusion patterns 410, 420, 430, and 440 form the open loop means that an overall shape of the protrusion patterns 410, 420, 430, and 440 is a loop shape at least partially opened (disconnected).

Since the protrusion patterns 410, 420, 430, and 440 have the open-loop shape as described above, the condensate, which moves along the condensate flow path 401 defined by the protrusion patterns 410, 420, 430, and 440, may be discharged to the outside of the protrusion patterns through the opened portions (disconnected portions of the loop) of the condensate flow path 401.

According to an exemplary embodiment of the present disclosure, each of the protrusion patterns 410, 420, 430, and 440 may include a first protrusion 471 formed in a first direction D1, a second protrusion 472 formed in the first direction D1 and spaced apart from the first protrusion 471 in the first direction D1, a third protrusion 473 spaced apart from the first protrusion 471 and formed in a second direction D2 that intersects the first direction D1, and a fourth protrusion 474 formed in the second direction D2 and spaced apart from the third protrusion 473 in the second direction D2.

In particular, the first protrusion 471, the second protrusion 472, the third protrusion 473, and the fourth protrusion 474 may be disposed to cooperatively form an X shape.

For reference, in an exemplary embodiment of the present disclosure, the example in which each of the protrusion patterns 410, 420, 430, and 440 has the four protrusions (the first protrusion, the second protrusion, the third protrusion, and the fourth protrusion) has been described. However, according to another exemplary embodiment of the present disclosure, the protrusion pattern may include three or less protrusions or five or more protrusions.

The number and the arrangement shape of the protrusion patterns 410, 420, 430, and 440, which constitute the first flow path forming part 400a and the second flow path forming part 400b, may be variously changed in accordance with required conditions and design specifications, and the present disclosure is not limited or restricted by the number of and the arrangement shape of the protrusion patterns 410, 420, 430, and 440.

Figure 6:
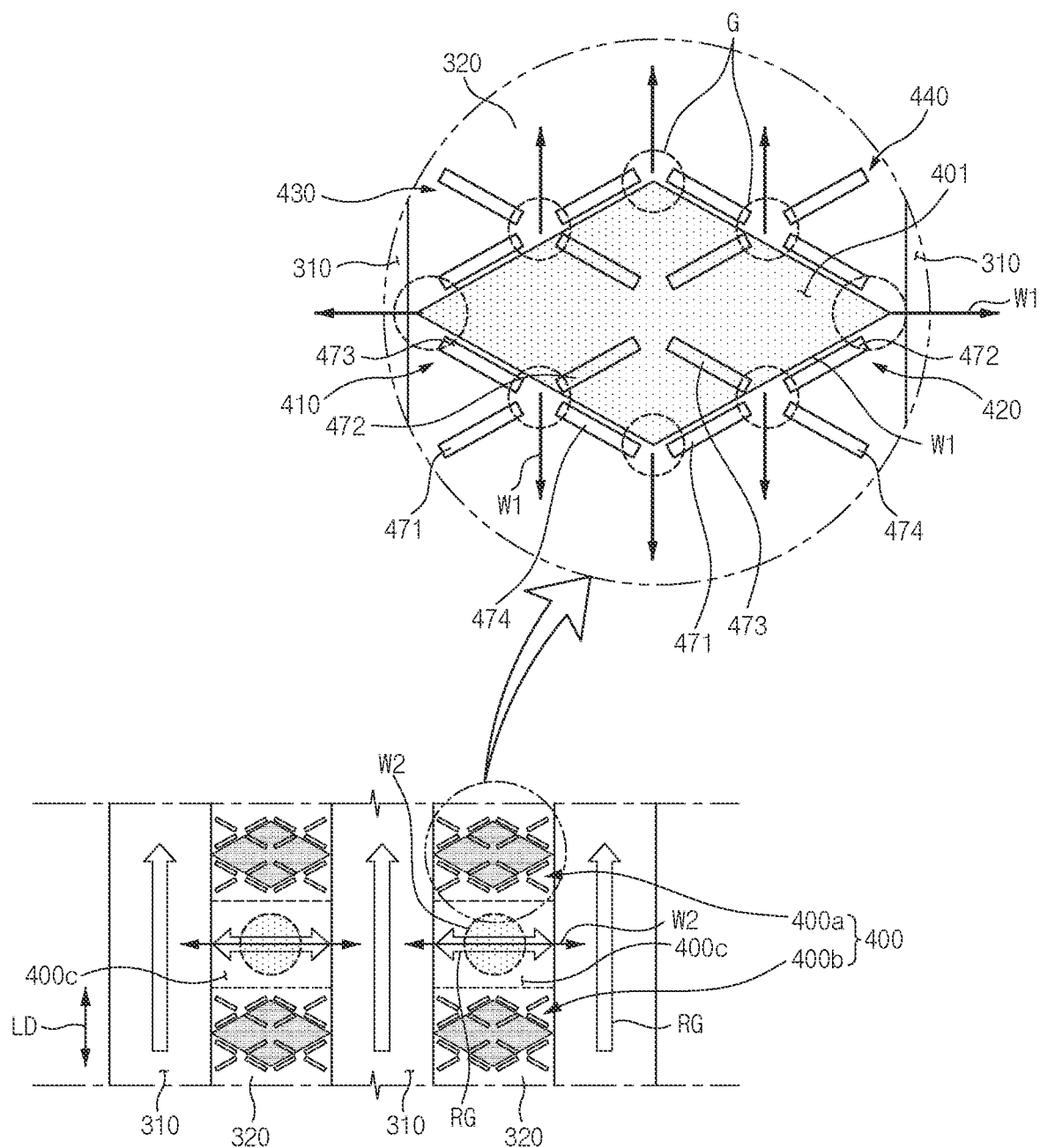

For example, referring to FIG. 6, each of the flow path forming parts 400 (the first flow path forming part and the second flow path forming part) may include the first protrusion pattern 410, the second protrusion pattern 420 spaced apart from the first protrusion pattern 410 in a width direction of the land 320, the third protrusion pattern 430 spaced apart from the first protrusion pattern 410 in the longitudinal direction of the land 320, and the fourth protrusion pattern 440 spaced apart from the second protrusion pattern 420 in the longitudinal direction of the land 320. The first to fourth protrusion patterns 410, 420, 430, and 440 may be arranged in an n×n matrix (in particular, a 2×2 matrix).

Each of the first to fourth protrusion patterns 410, 420, 430, and 440 may be provided by arranging the first protrusion 471, the second protrusion 472, the third protrusion 473, and the fourth protrusion 474 so that the first protrusion 471, the second protrusion 472, the third protrusion 473, and the fourth protrusion 474 cooperatively form an X shape.

Since the plurality of protrusion patterns (e.g., the first to fourth protrusion patterns), which form the X shape, are arranged in a n×n matrix (e.g., a 2×2 matrix) as described above, it is possible to obtain an advantageous effect of ensuring the discharge of the condensate and increasing the time for which the condensate stays (in the condensate flow path 401).

That is, since the condensate is discharged to the outside of the land 320 through the condensate flow path, it is possible to minimize deterioration in performance and operational efficiency caused by the residual condensate. However, if the condensate existing between the gas diffusion layer 200 and the land 320 is rapidly discharged within a short time, contact resistance between the land 320 of the separator 300 and the gas diffusion layer 200 is increased, which causes a problem in that a loss of voltage is increased.

However, in an exemplary embodiment of the present disclosure, since the four protrusion patterns (the first to fourth protrusion patterns) 410, 420, 430, and 440 having the X shape are arranged in the 2×2 matrix, the condensate may temporarily stagnate (the time for which the condensate stay may be increased) in an approximately central portion of the condensate flow path 401 (e.g., in a rhombic region in FIG. 6), the condensate may be discharged from an edge portion (side portion) of the condensate flow path 401, or the edge portion (side portion) of the condensate flow path 401 may be dried, such that it is possible to obtain an advantageous effect of preventing the condensate from being rapidly discharged.

For reference, a speed (or a discharge amount) at which the condensate is discharged from the edge portion (side portion) of the condensate flow path 401 or the edge portion (side portion) of the condensate flow path 401 is dried may be controlled by adjusting gaps G (spacing distances) between the adjacent protrusion patterns 410, 420, 430, and 440 or adjusting sizes of the gaps G between the adjacent protrusions, and the present disclosure is not limited or restricted by the size of the gap G.

In an exemplary embodiment of the present disclosure described and illustrated above, the example in which each of the first flow path forming part 400a and the second flow path forming part 400b includes the four protrusion patterns 410, 420, 430, and 440 has been described. However, according to another exemplary embodiment of the present disclosure, each of the first flow path forming part 400a and the second flow path forming part 400b may include three or less protrusion patterns or five or more protrusion patterns.

Meanwhile, in an exemplary embodiment of the present disclosure described and illustrated above, the example in which each of the protrusions, which constitute the flow path forming part 400, has a straight shape has been described. However, according to another exemplary embodiment of the present disclosure, each of the protrusions (protrusion patterns), which constitute the flow path forming part 400, may have a curved shape, a bent shape, or other shapes.

Figure 7:
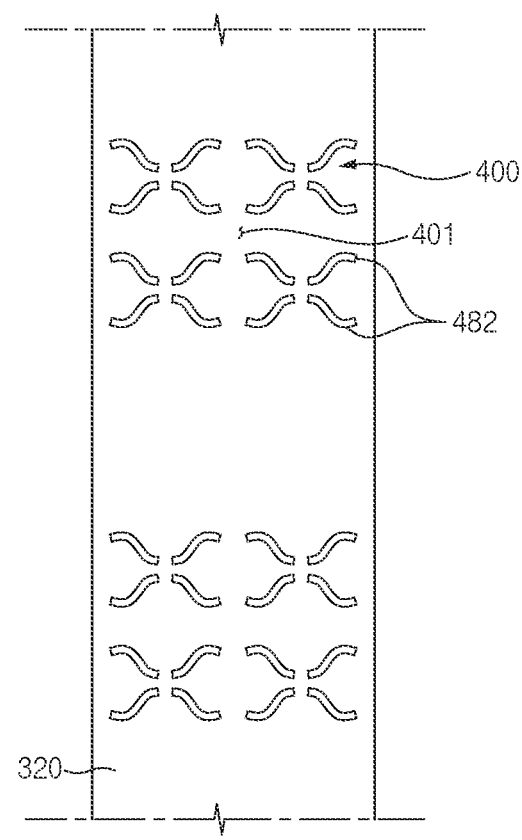
FIGS. 7 to 9 are views for explaining modified examples of the flow path forming part in the fuel cell according to an exemplary embodiment of the present disclosure.

For example, referring to FIG. 7, the flow path forming part 400 may include curved protrusions 482 each having an approximately S-shape and the condensate flow path 401 may be defined in a region between the plurality of curved protrusions 482. According to another exemplary embodiment of the present disclosure, the curved protrusion may have an arc shape or other shapes.

Figure 8:
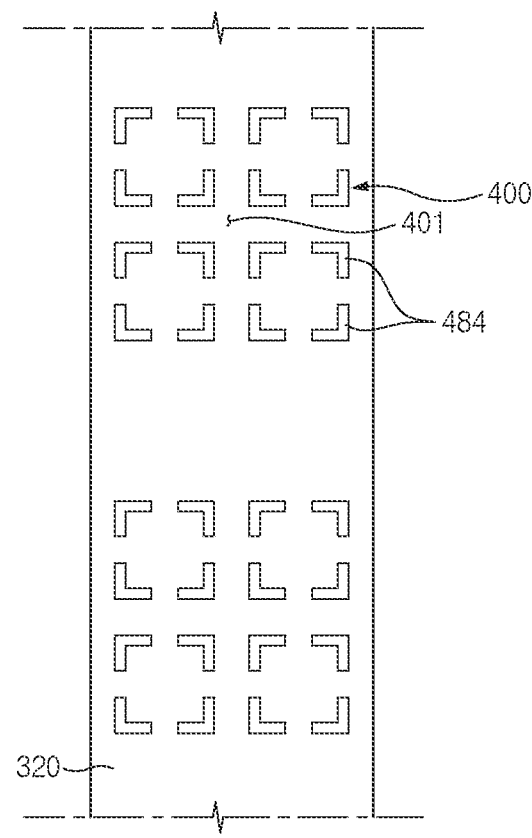

As another example, referring to FIG. 8, the flow path forming part 400 may include bent protrusions 482 each bent in an approximately L shape, and the condensate flow path 401 may be defined in a region between the plurality of bent protrusions 482. According to another exemplary embodiment of the present disclosure, the curved protrusion may have a U shape or other bent structures.

Figure 9:
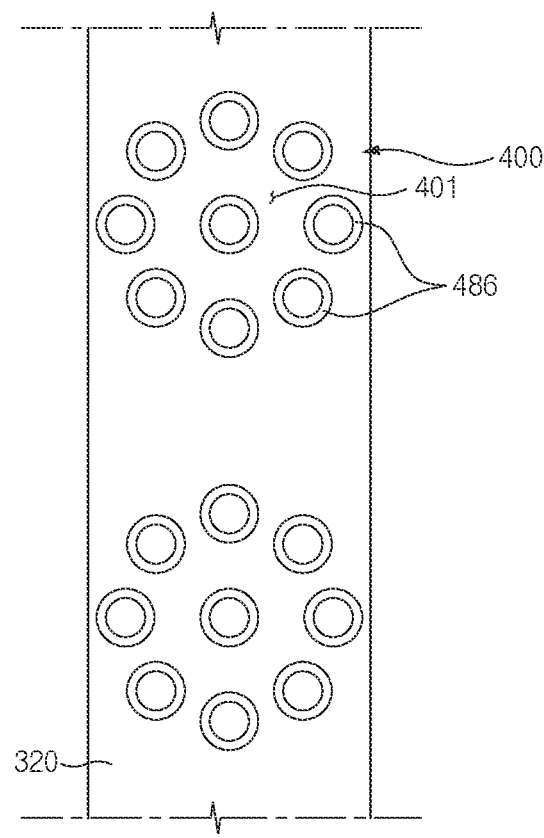

As still another example, referring to FIG. 9, the flow path forming part 400 may include ring protrusions 486 each having an approximately circular ring shape and the condensate flow path 401 may be defined in a region between the plurality of ring protrusions 486. According to another exemplary embodiment of the present disclosure, the ring protrusion may have a triangular ring shape, a quadrangular ring shape, or other ring shapes.

The flow path forming part 400 may be formed in various ways in accordance with required conditions and design specifications.

According to an exemplary embodiment of the present disclosure, the flow path forming part 400 may be formed by partially forming a part of the separator 300.

Since the flow path forming part 400 (e.g., the protrusion pattern) is formed by partially forming a part of the separator 300 (e.g., a metal material) as described above, it is possible to obtain an advantageous effect of reducing costs and simplifying a structure and a manufacturing process for forming the flow path forming part 400.

According to another exemplary embodiment of the present disclosure, the flow path forming part may be separately manufactured and then attached or coupled to the separator.

According to an exemplary embodiment of the present disclosure, the fuel cell 10 may include connecting protrusion patterns 450 protruding from the land surface 322, and the connecting protrusion patterns 450 may connect the adjacent protrusion patterns 410, 420, 430, and 440.

Figure 10:
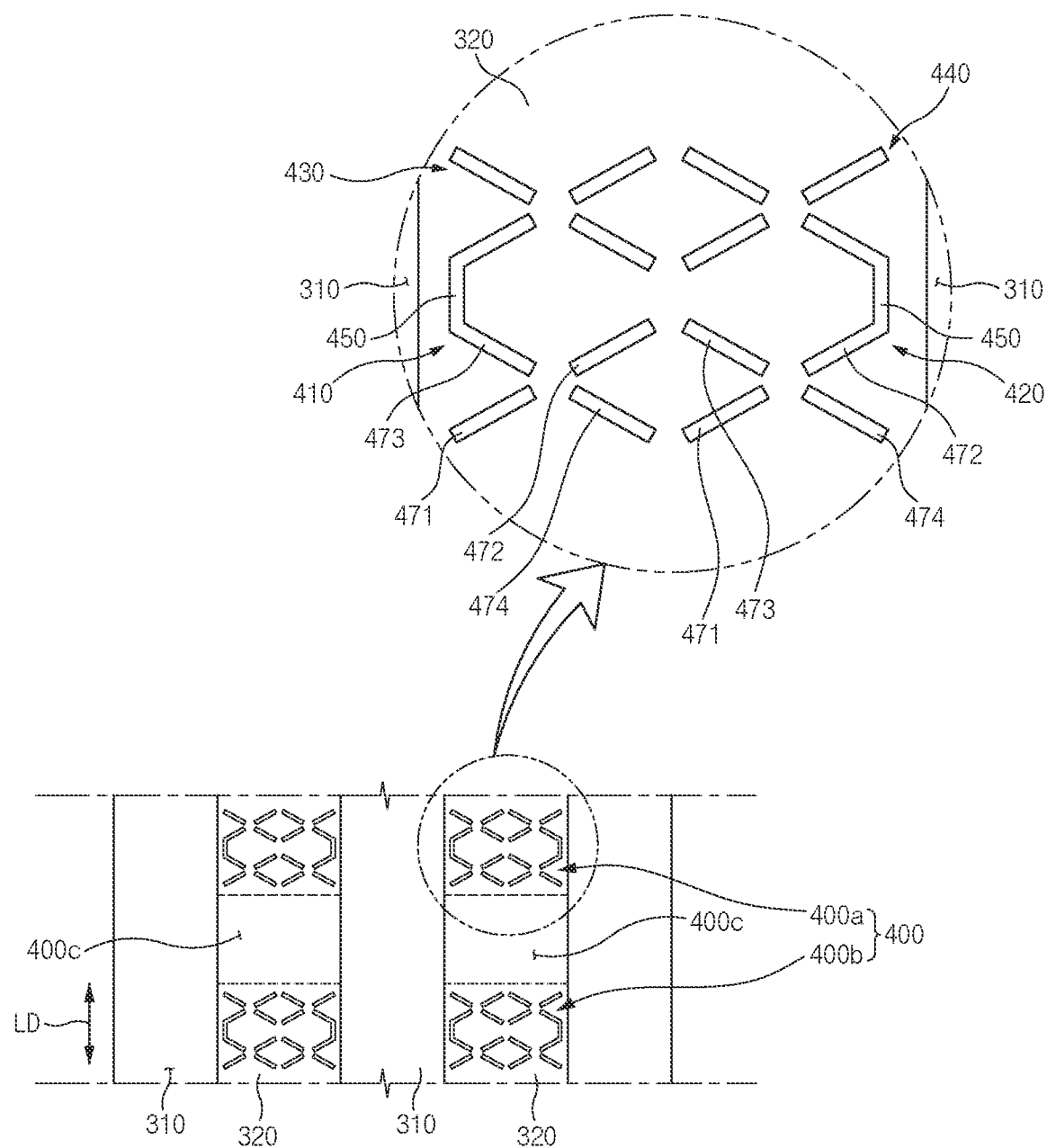
FIG. 10 is a view for explaining a connecting protrusion pattern in the fuel cell according to an exemplary embodiment of the present disclosure.

For example, referring to FIG. 10, the fuel cell 10 may include the connecting protrusion pattern 450 that connects the first protrusion pattern 410 and the third protrusion pattern 430 (or the second protrusion pattern and the fourth protrusion pattern) disposed to be spaced apart from each other in the longitudinal direction LD of the land 320.

Since the first protrusion pattern 410 and the third protrusion pattern 430, which are adjacent to each other, are connected by the connecting protrusion pattern 450 as described above, it is possible to prevent the condensate from being immediately discharged to the side (channel side) of the land 320 through the gap G between the first protrusion pattern 410 and the third protrusion pattern 430, and as a result, it is possible to obtain an advantageous effect of increasing the time for which the condensate stays in the condensate flow path 401.

In particular, the connecting protrusion pattern 450 is connected to outermost peripheral portions of the protrusion patterns in the width direction WD of the land 320. Since the connecting protrusion pattern 450 is connected to the outermost peripheral portions of the protrusion patterns (e.g., left ends of the first and third protrusion patterns based on FIG. 10) as described above, it is possible to obtain an advantageous effect of increasing a space in which the condensate stays.

In particular, the connecting protrusion pattern 450, together with the first protrusion pattern 410 and the third protrusion pattern 430 (or the second protrusion pattern and the fourth protrusion pattern), may be formed by partially forming a part of the separator 300.

For reference, in an exemplary embodiment of the present disclosure, the example in which the connecting protrusion pattern 450 connects the protrusion patterns, which are adjacent to each other in the longitudinal direction of the land 320, has been described. However, according to another exemplary embodiment of the present disclosure, the connecting protrusion pattern may connect the protrusion patterns which are adjacent to each other in the width direction of the land.

According to an exemplary embodiment of the present disclosure, the flow path forming parts 400 may include the first flow path forming part 400a provided on the land surface 322, and the second flow path forming part 400b provided on the land surface 322 and spaced apart from the first flow path forming part 400a in the longitudinal direction of the land 320. A discharge path 400c is provided between the first flow path forming part 400a and the second flow path forming part 400b and communicates with the condensate flow path 401, and the reactant gas RG passes through the discharge path 400c. The condensate may be discharged to the channel 310 together with the reactant gas RG passing through the discharge path 400c.

Since the discharge path 400c is defined between the first and second flow path forming parts 400a and 400b protruding from the land surface 322 as described above, it is possible to obtain an advantageous effect of more effectively discharging (to the channel 310) the condensate W2 moved to the edge portion (side portion) of the condensate flow path 401 as well as the condensate W1 produced on the land surface 322 corresponding to the discharge path 400c or an advantageous effect of more effectively drying the region in which the condensate exists.

For reference, a pore in a portion of the gas diffusion layer 200, which corresponds to the discharge path 400c (i.e., the region between the first flow path forming part and the second flow path forming part), may have a larger size than a pore in a portion of the gas diffusion layer 200 which is in contact with (pressed by) the first flow path forming part 400a and the second flow path forming part 400b. Since the flow resistance of the reactant gas RG moving along the discharge path 400c (the resistance that hinders the movement of the reactant gas RG) is minimized (i.e., the size of the pore is ensured) as described above, it is possible to obtain an advantageous effect of ensuring the smooth movement of the reactant gas RG and improving efficiency in discharging the condensate.

In particular, a width (length) of the discharge path 400c in the longitudinal direction of the land 320 may be defined as a length by which the gas diffusion layer 200 may be in contact with the land surface 322. Since the width of the discharge path 400c is defined as the length by which the gas diffusion layer 200 is in contact with the land surface 322 as described above, it is possible to obtain an advantageous effect of minimizing an increase in contact resistance caused by the discharge path 400c.

In an exemplary embodiment of the present disclosure described and illustrated above, the example in which the discharge path 400c is disposed between the first flow path forming part 400a and the second flow path forming part 400b and formed in a direction (the width direction of the land 320) perpendicular to the longitudinal direction of the land 320 has been described. However, according to another exemplary embodiment of the present disclosure, the discharge path may be formed to be inclined with respect to the width direction of the land.

Figure 11:
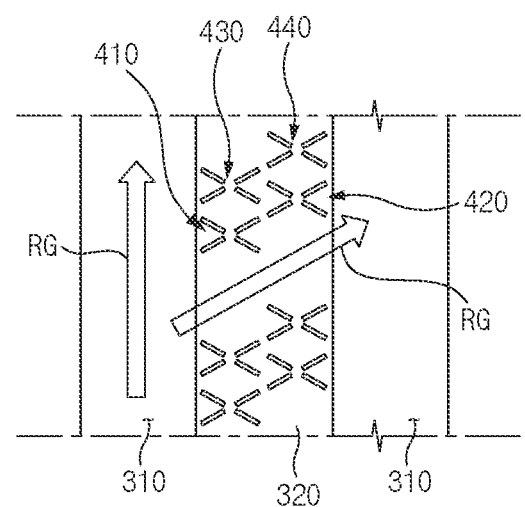
FIG. 11 is a view for explaining a modified example of a first flow path forming part and a second flow path forming part in the fuel cell according to an exemplary embodiment of the present disclosure.

Referring to FIG. 11, according to an exemplary embodiment of the present disclosure, the discharge path 400c may be formed to be inclined, with respect to the width direction of the land 320, in a movement direction in which the reactant gas RG moves along the land 320.

This is to minimize a decrease in flow pressure of the reactant gas RG moving along the discharge path 400c and to improve efficiency in discharging the condensate W1 and W2.

Based on FIG. 11, the reactant gas RG may move from the lower side to the upper side in the longitudinal direction of the land 320 (the channel), and a part of the reactant gas RG may move to another adjacent channel 310 via the inclined discharge path 400c.

Since the discharge path 400c, through which the reactant gas RG passes, is formed to be inclined with respect to the width direction of the land 320 (inclined upward and rightward based on FIG. 11) as described above, it is possible to obtain an advantageous effect of minimizing a decrease in flow pressure of the reactant gas RG and improving efficiency in discharging the condensate W1 and W2 being discharged together with the reactant gas RG.

In an exemplary embodiment of the present disclosure described and illustrated above, the example in which the condensate flow path 401 is defined by the protrusion patterns 410, 420, 430, and 440 has been described. However, according to another exemplary embodiment of the present disclosure, the condensate flow path may be defined by a porous structure.

Figure 12:
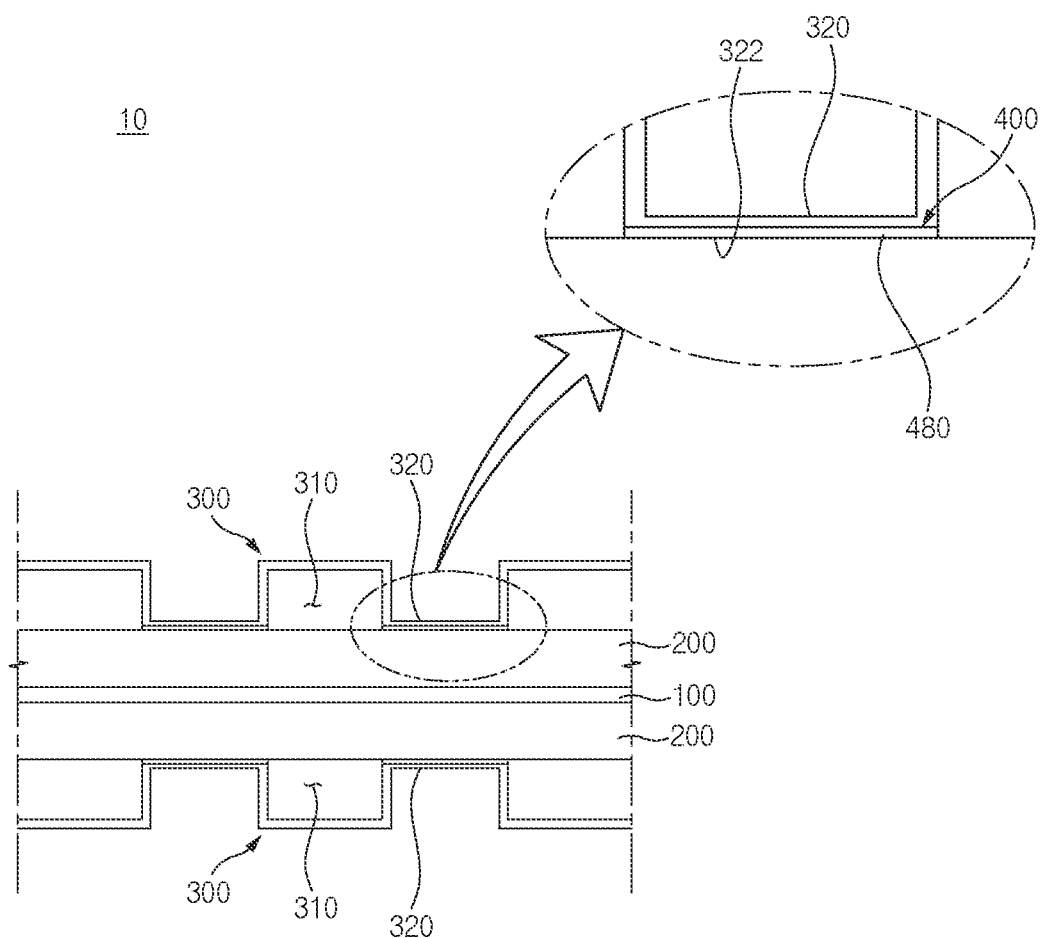
FIG. 12 is a view for explaining a porous structure in the fuel cell according to an exemplary embodiment of the present disclosure.

Referring to FIG. 12, the flow path forming part 400 (e.g., the first flow path forming part and the second flow path forming part) is provided on the land surface 322 and includes a porous structural member 480, and the condensate flow path 401 may be defined by pores of the porous structural member 480.

The porous structural member 480 may be configured as a typical porous member having pores capable of defining the condensate flow path 401, and the present disclosure is not limited or restricted by the type and the material of the porous structural member 480.

For example, a microporous layer (MPL), which has a pore having a larger size than the pore of the gas diffusion layer 200, may be used as the porous structural member 480.

According to an exemplary embodiment of the present disclosure as described above, it is possible to obtain an advantageous effect of improving performance and operational efficiency.

In particular, according to an exemplary embodiment of the present disclosure, it is possible to obtain an advantageous effect of effectively discharging the condensate produced between the gas diffusion layer and the land of the separator and minimizing deterioration in performance and operational efficiency caused by the residual condensate.

In addition, according to an exemplary embodiment of the present disclosure, it is possible to obtain an advantageous effect of minimizing deformation of and damage to the gas diffusion layer and improving durability.

In addition, according to an exemplary embodiment of the present disclosure, it is possible to obtain an advantageous effect of minimizing the residual condensate produced between the gas diffusion layer and the land of the separator and reducing contact resistance between the gas diffusion layer and the separator.

In addition, according to an exemplary embodiment of the present disclosure, it is possible to obtain an advantageous effect of improving stability and reliability.

While the exemplary embodiments have been described above, the exemplary embodiments are just illustrative and not intended to limit the present disclosure. It can be appreciated by those skilled in the art that various modifications and alterations, which are not described above, may be made to the present exemplary embodiments without departing from the intrinsic features of the present exemplary embodiments. For example, the respective constituent elements specifically described in the exemplary embodiments may be modified and then carried out. Further, it should be interpreted that the differences related to the modifications and alterations are included in the scope of the present disclosure defined by the appended claims.

What is claimed is:

1. A fuel cell comprising:
a membrane electrode assembly;
gas diffusion layers stacked on each side of the membrane electrode assembly, respectively; and
separators stacked on the gas diffusion layers, respectively, the separators comprising:
channels through which reactant gases are movable;
lands in contact with a respective one of the gas diffusion layers; and
a flow path forming part protruding from a land surface of one of the lands in contact with the respective one of the gas diffusion layers, the flow path forming part providing a condensate flow path configured to move condensate exiting between the land surface and the one of the gas diffusion layers,
wherein the flow path forming part comprises protrusion patterns protruding from the land surface and spaced apart from one another,
wherein the protrusion patterns cooperatively form the condensate flow path,
wherein the flow path forming part comprises:
a first protrusion pattern,
a second protrusion pattern spaced apart from the first protrusion pattern in a width direction of the land,
a third protrusion pattern spaced apart from the first protrusion pattern in a longitudinal direction of the land, and
a fourth protrusion pattern spaced apart from the second protrusion pattern in the longitudinal direction of the land
wherein each of the protrusion patterns comprises:
a first protrusion,
a second protrusion spaced apart from the first protrusion in the width direction of the land,
a third protrusion spaced apart from the first protrusion in the longitudinal direction of the land, and
a fourth protrusion spaced apart from the second protrusion in the longitudinal direction of the land, and
wherein the first protrusion, the second protrusion, the third protrusion and the fourth protrusion cooperatively form an X shape.

2. The fuel cell of claim 1, wherein the condensate flow path is defined as a space having a larger size than a pore of the one of the gas diffusion layers.

3. The fuel cell of claim 1, wherein at least a part of the condensate flow path communicates with at least one of the channels.

4. The fuel cell of claim 1, further comprising a connecting protrusion pattern protruding from the land surface and configured to connect adjacent ones of the protrusion patterns.

5. The fuel cell of claim 4, wherein the connecting protrusion pattern is connected to outermost peripheral portions of the adjacent ones of the protrusion patterns in the width direction of the land.

6. The fuel cell of claim 1, wherein the flow path forming part comprises:
a first flow path forming part provided on the land surface; and a second flow path forming part provided on the land surface and spaced apart from the first flow path forming part in the longitudinal direction of the land, wherein a discharge path, through which a reactant gas is able to pass, is provided between the first flow path forming part and the second flow path forming part and communicates with the condensate flow path, and wherein the condensate is dischargeable through a channel together with the reactant gas that is able to pass through the discharge path.

7. The fuel cell of claim 6, wherein the discharge path is inclined with respect to the width direction of the land.

8. The fuel cell of claim 1, wherein the flow path forming part is formed by partially forming a part of the separators.

9. The fuel cell of claim 1, wherein the flow path forming part comprises a porous structural member provided on the land surface.

10. The fuel cell of claim 9, wherein the condensate flow path is defined by pores of the porous structural member.

11. The fuel cell of claim 1, wherein the protrusion patterns form an open loop.

12. The fuel cell of claim 1, wherein at least one of the first protrusion, the second protrusion, the third protrusion, and the fourth protrusion has a straight shape.

13. The fuel cell of claim 1, wherein at least one of the first protrusion, the second protrusion, the third protrusion, and the fourth protrusion has a curved shape.

* * * * *

UNITED STATES PATENT AND TRADEMARK OFFICE
CERTIFICATE OF CORRECTION

| | | |
|---|---|---|
| PATENT NO. | : 11,870,108 B2 | Page 1 of 1 |
| APPLICATION NO. | : 17/164279 | |
| DATED | : January 9, 2024 | |
| INVENTOR(S) | : Sung Hun Yoo | |

It is certified that error appears in the above-identified patent and that said Letters Patent is hereby corrected as shown below:

In the Claims

In Column 14, in Claim 1, Line 36, after "land" insert -- , --.

Signed and Sealed this
Sixteenth Day of April, 2024

Katherine Kelly Vidal
*Director of the United States Patent and Trademark Office*